United States Patent
Sibel et al.

(10) Patent No.: US 12,279,309 B2
(45) Date of Patent: Apr. 15, 2025

(54) METHOD TO COMMUNICATE BETWEEN SYNCHRONIZED MOBILE DEVICES, STORAGE MEDIUM AND MOBILE DEVICE

(71) Applicant: MITSUBISHI ELECTRIC CORPORATION, Tokyo (JP)

(72) Inventors: Jean-Christophe Sibel, Rennes (FR); Mourad Khanfouci, Rennes (FR); Nicolas Gresset, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 403 days.

(21) Appl. No.: 17/787,154

(22) PCT Filed: Dec. 23, 2020

(86) PCT No.: PCT/JP2020/049301
§ 371 (c)(1),
(2) Date: Jun. 17, 2022

(87) PCT Pub. No.: WO2021/181843
PCT Pub. Date: Sep. 16, 2021

(65) Prior Publication Data
US 2023/0037615 A1    Feb. 9, 2023

(30) Foreign Application Priority Data

Mar. 12, 2020   (EP) ..................................... 20305259

(51) Int. Cl.
*H04W 74/0816*   (2024.01)
*H04B 7/06*   (2006.01)
(Continued)

(52) U.S. Cl.
CPC ...... *H04W 74/0816* (2013.01); *H04B 7/0695* (2013.01); *H04W 72/02* (2013.01); *H04W 72/40* (2023.01); *H04W 76/14* (2018.02)

(58) Field of Classification Search
CPC .............. H04B 7/0695; H04B 7/06952; H04B 7/06954–06968; H04B 7/088;
(Continued)

(56) References Cited

U.S. PATENT DOCUMENTS

2022/0039080 A1*   2/2022   Khoryaev ............... H04W 4/40

FOREIGN PATENT DOCUMENTS

EP    3 609 260 A1   2/2020

OTHER PUBLICATIONS

3GPP, "3rd Generation Partnership Project; Technical Specification Group Radio Access Network; Overall description of Radio Access Network (RAN) aspects for Vehicle-to-everything (V2X) based on LTE and NR (Release 16)," 3GPP TR 37.985, V1.1.0, Feb. 2020, p. 32.

(Continued)

*Primary Examiner* — Thomas R Cairns
(74) *Attorney, Agent, or Firm* — Birch, Stewart, Kolasch & Birch, LLP

(57) ABSTRACT

Examples include a method to communicate between a first and a second synchronized mobile devices, the method comprising sensing a plurality of preconfigured radio resources and identifying for each sensed preconfigured radio resource, whether it is occupied. The method also comprises receiving an indication of future occupied preconfigured radio resource utilization by further mobile devices in the spatial domain, and selecting a specific pre-configured radio resource reducing or preventing communication collisions in the spatial domain. The method further comprises the first and the second mobile devices communicating using the selected specific preconfigured radio resource.

14 Claims, 4 Drawing Sheets

(51) Int. Cl.
*H04W 72/02* (2009.01)
*H04W 72/40* (2023.01)
*H04W 76/14* (2018.01)

(58) Field of Classification Search
CPC ..... H04W 4/06; H04W 52/383; H04W 72/02; H04W 72/40; H04W 72/53; H04W 74/0816; H04W 76/14; H04W 72/046; H04W 72/25; H04W 72/51; H04W 72/542; H04W 92/18
See application file for complete search history.

(56) References Cited

OTHER PUBLICATIONS

Japanese Office Action for Japanese Application No. 2022-556374, dated Nov. 21, 2023, with English translation.
Huawei, "Beamforming for V2X sidelink for FR1 and FR2", 3GPP TSG WGI Meeting #96 R1-1903075, Oct. 14, 2019, pp. 1-4.
Japanese Notice of Reasons for Refusal for Japanese Application No. 2022-556374, dated Jun. 6, 2023, with English translation.
Vivo, Discussion on mode 2 resource allocation mechanism, 3GPP TSG RAN WG1 #98bis meeting, Feb. 25, 2019, pp. 1-6.
3GPP TR 38.885 V2.0.0, "3rd Generation Partnership Project; Technical Specification Group Radio Access Network; NR; Study on Vehicle-to-Everything (Release 16)", Mar. 2019, pp. 1-33.
International Search Report for PCT/JP2020/049301 mailed on Apr. 28, 2021.
Written Opinion of the International Searching Authority for PCT/JP2020/049301 mailed on Apr. 28, 2021.
Korean Office Action for Korean Application No. 10-2022-7030118, dated Dec. 26, 2024, with English translation.
TCL Communication, "Physical Layer Procedures for Sidelink," 3GPP TSG RAN WG1 Meeting #98, R1-1908279, Aug. 26-30, 2019, 14 pages total.

* cited by examiner

[FIG. 1]
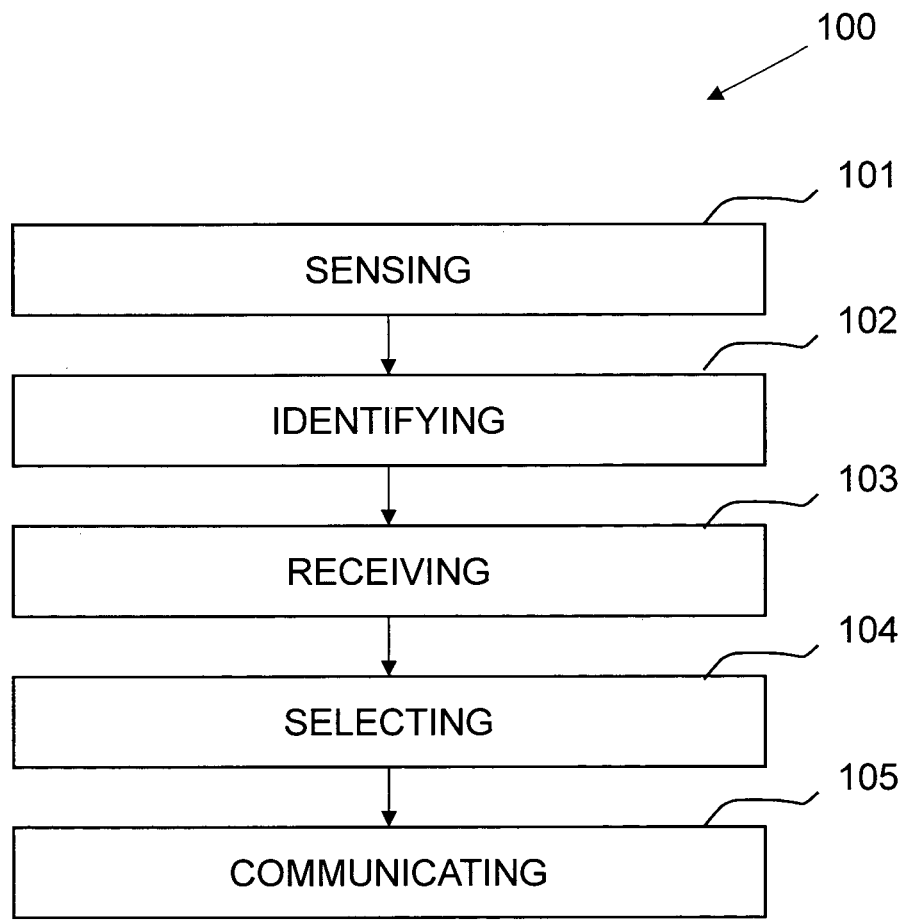

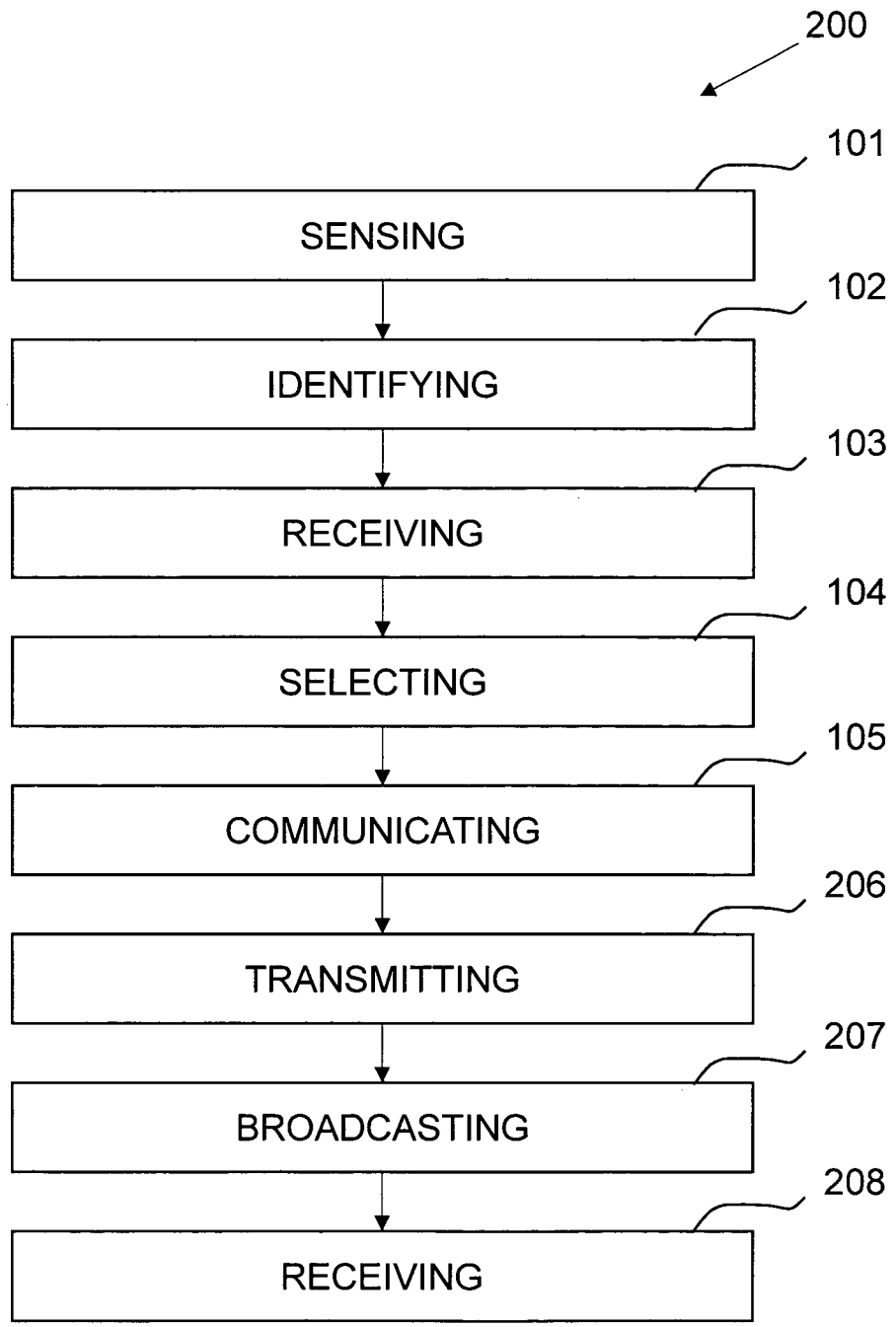
[FIG. 2]

[FIG. 3]
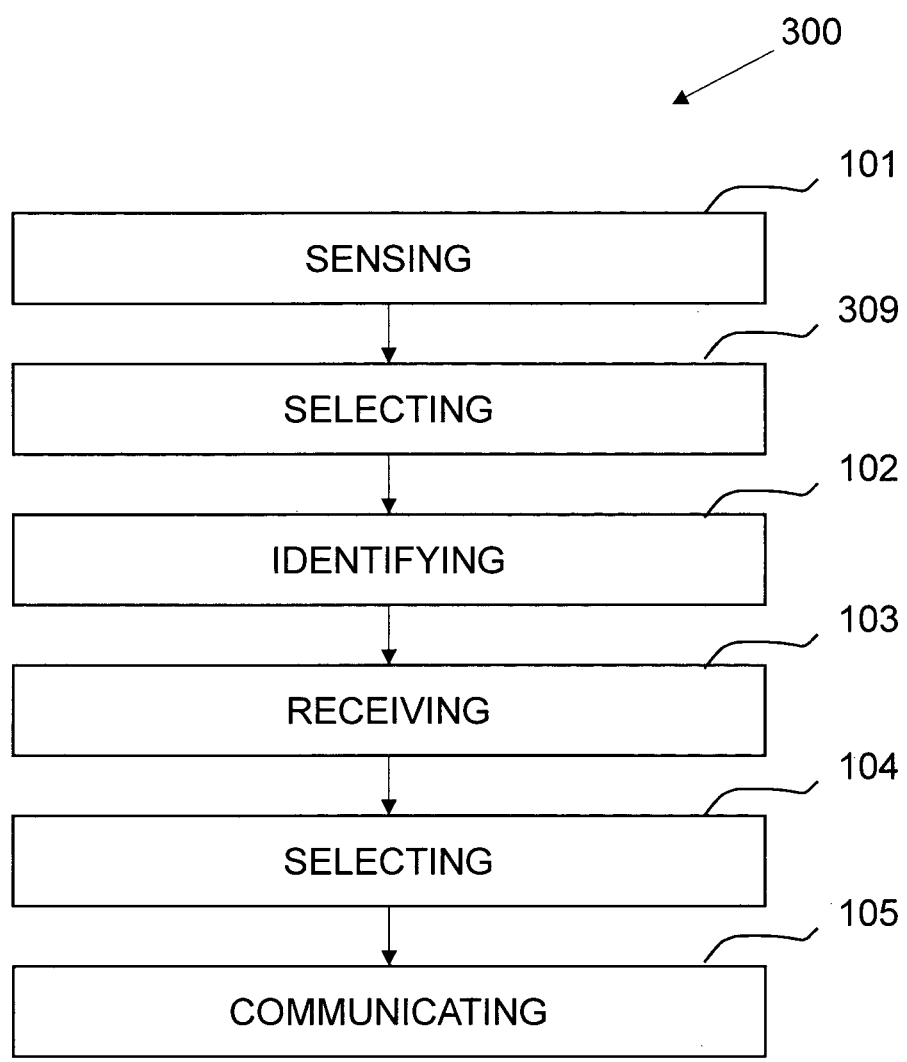

[FIG. 4]
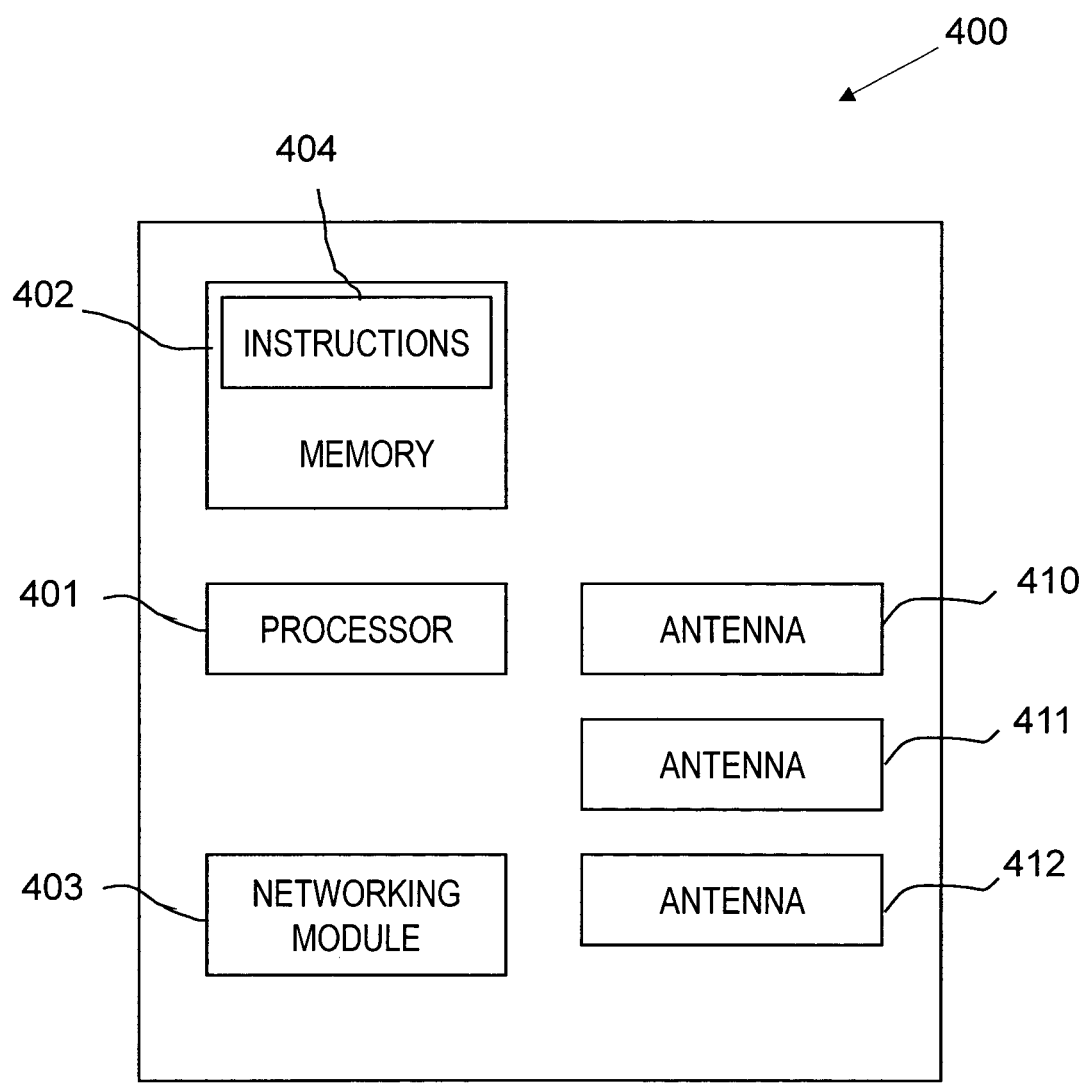

METHOD TO COMMUNICATE BETWEEN SYNCHRONIZED MOBILE DEVICES, STORAGE MEDIUM AND MOBILE DEVICE

TECHNICAL FIELD

The present disclosure relates to the field of communication between mobile devices, in particular, direct communication between mobile devices without communicating through a base station.

BACKGROUND ART

A mobile device may communicate with a base station covering a communication cell, such communication with a base station enabling communication with other mobile devices through such base station, which acts as an intermediary between mobile devices. In other situations, a mobile device may directly communicate with another mobile device without communicating through a base station. Such direct communication between mobile devices may take place through a so called sidelink communication.

SUMMARY OF INVENTION

The invention is defined by the appended independent claims. Additional features and advantages of the concepts herein disclosed are set forth in the description which follows.

The present disclosure describes a method to communicate between a first mobile device and a second mobile device synchronized with the first mobile device, the method comprising:
- sensing, by the first mobile device, a plurality of preconfigured radio resources, each preconfigured radio resource corresponding to a specific set of coordinates in time, frequency and spatial domains;
- identifying, by the first mobile device, for each sensed preconfigured radio resource, whether the preconfigured radio resource is occupied for communication between further mobile devices synchronized with the first mobile device;
- receiving, at the first or at the second mobile device, for each occupied preconfigured radio resource, and from the further mobile devices, an indication of future occupied preconfigured radio resource utilization by the further mobile devices in the spatial domain;
- selecting, by the first or by the second mobile device, a specific preconfigured radio resource for the first and the second mobile devices to communicate using a specific beam in the spatial domain, whereby using the specific beam is reducing or preventing communication collisions, in the spatial domain, with the future occupied preconfigured radio resource utilization; and
- communicating between the first and the second mobile devices using the selected specific preconfigured radio resource.

Such a method permits for example a reduction of communication collision risks by using a specific beam for a communication between mobile devices, the specific beam being a specific beam in a spatial domain of a specific subchannel defined in the time and frequency domain. The specific beam is selected taking into account both information collected by sensing preconfigured radio resources or communication subchannels, and information as to future use of the radio resources.

Optionally, the method further comprises transmitting, by the first or by the second mobile device, and to the further mobile devices, a specific indication of future occupied preconfigured radio resource utilization in the spatial domain for the communicating between the first and the second mobile devices. Such transition may for example be used by other mobile devices to select their own radio resources while avoiding future collisions with the radio resource occupied for communication between the first and the second mobile devices.

Optionally, the receiving the indication of future occupied preconfigured radio resource utilization by the further mobile devices in the spatial domain takes place using a signal orthogonal to a signal for the communication between the first and the second mobile devices. This may for example avoid occupying, for communicating the indication of future occupied preconfigured radio resource utilization by the further mobile devices in the spatial domain, a spectrum used for the communication between the first and the second mobile devices.

Optionally, the selecting the specific preconfigured radio resource for the communication between the first and the second mobile device using a specific beam in the spatial domain takes into account line of sight, LoS, information related to the first, the second and the further mobile devices. This may for example both render the beam selection more efficient by providing a default option such as selecting a beam for a mobile devices pair most aligned with a LoS corresponding to this same mobile devices pair, and leverage the fact that the LoS information inherently takes into account the fact that different mobile devices may be located in different locations, thereby offering a default manner to avoid communication collisions in the spatial domain.

Optionally, the method further comprises broadcasting, by the first or by the second mobile device, one or more of a respective mobile device identifier, and respective mobility information. Such broadcasting may for example permit to other mobile devices to predict a future trajectory of such first and second mobile devices, and to take such future trajectory into account to select a communication resource avoiding a collision, in the spatial domain, with the communication resource used between the first and second mobile devices to communicate.

Optionally, the method further comprises:
- either receiving, at the first mobile device, one or more of a second mobile device identifier, and second mobile device mobility information; or receiving, at the second mobile device, one or more of a first mobile device identifier, and first mobile device mobility information; and
- receiving, at the first or at the second mobile device, one or more of an identifier, or mobility information from each of the one or more further mobile devices.

This may for example permit to the mobile device receiving this information (being either one of the pair of mobile devices formed by the first and the second mobile devices) to get trajectory information for surrounding mobile devices as well as the other mobile device of the pair, thereby enabling a selection of communication resource for the pair which would avoid or reduce communication collision risks for the pair of mobile devices.

Optionally, the sensing of the plurality of preconfigured radio resources and the selecting of the specific preconfigured radio resource are selectively triggered using a rule. Such a rule may for example determine how often and in which order the various steps of the method may take place. Such a rule may be dynamically determined to adapt the method to specific situations.

Optionally, the method further comprises:
  detecting, by the first mobile device, a potential future communication collision between the selected specific preconfigured radio resource and the received future occupied preconfigured radio resource utilization; and
  in response to detecting the collision, proceed with one or more of:
    selecting an alternative specific preconfigured radio resource to communicate between the first and the second mobile devices;
    pausing communication during a collision time.

Such proceeding with the selection of an alternative radio resource and/or with pausing communication would indeed permit avoiding a potential future communication collision and contribute to reducing communication collision risks.

Optionally, the method further comprises selecting the further mobile devices from a group of surrounding mobile devices using selection criteria. This may for example permit handling a situation where numerous surrounding mobile devices are present. The use of a criteria to select a number of further mobile devices for processing according to the methods hereby described, such further mobile devices being a subgroup from the surrounding mobile devices and being thereby less complex to process than a larger group of numerous surrounding devices. Specifically, the criteria may comprise one or more of:
  a distance between each surrounding mobile device and the first mobile device; or
  a signal interference noise ratio, SINR.

If the criteria take distance into account, further mobile devices considered may for example be the mobile devices closest to either one or both of the pair formed by the first and second mobile devices. If the criteria take SINR into account, further mobile devices considered may for example be the mobile devices having a relatively higher SINR. Specifically, the selection criteria may progressively evolve over time so a number of the selected further mobile devices increases over time. Such an evaluative approach may enable the phased processing of a relatively large number of surrounding mobile devices, the criteria becoming for example progressively less selective to include a progressively higher number of surrounding mobile vehicles in the spatial domain collision avoidance selection of beam specific communication resources. Specifically, the criteria may comprise a distance between each surrounding mobile device and the first or the second mobile device, whereby the distance between each further mobile device and the first or second mobile device is of less than a threshold. In some cases, such a distance threshold may increase over time to progressively encompass additional mobile devices which are taken into account for reduction or avoidance of communication collisions in the spatial domain. In some cases, a transmission power for the communicating with the second mobile device is set to avoid a communication collision with a mobile device located beyond the threshold. Such a setting of the transmission power may for example evolve over time by increasing the transmission over time as the criteria also evolves over time resulting in progressively increasing a number of further mobile devices considered by the method of this disclosure.

The present disclosure also describes a computer-readable storage medium comprising instructions which, when executed by a processor of a mobile device, cause the processor to carry out any of the methods hereby described. Such instructions permit enabling the methods hereby described.

The present disclosure also describes a mobile device comprising a processor, a memory, a networking module and a plurality of antennas permitting beamforming, the processor being configured to operate according to any of the methods hereby described. Such a mobile device may therefore put into practice the methods hereby described.

BRIEF DESCRIPTION OF DRAWINGS

FIG. 1 illustrates an example method.
FIG. 2 illustrates another example method.
FIG. 3 illustrates a further example method.
FIG. 4 illustrates an example mobile device.

DESCRIPTION OF EMBODIMENTS

This disclosure applies mobile devices. A mobile device should be understood as a mobile communication device which is not permanently stationary. Such mobile communication device may communicate using a networking module. Such a mobile device may be a mobile terminal carried by a human or by a vehicle. The mobile device may be a vehicle comprising a networking module. The mobile device may be carried by a driver or passenger of a vehicle. The mobile device may be configured to be mobile on a road network, on waterways or in the air. The mobile device may be a drone comprising a networking module. The mobile device may be a car, truck, tractor, factory robot, satellites or bus comprising a networking module. The mobile device may be a connected autonomous or partially autonomous vehicle configured to autonomously or partially autonomously drive itself by using radio resources. Autonomous driving may not require a human driver, while partially autonomous driving may require the presence of a human driver in a vehicle to operate.

The mobile devices may according to this disclosure be named as "first" or "second" in order to differentiate such specific mobile devices from other mobile devices which may interact with these mobile devices. The first or second mobile device may however be similar to or different from other mobile devices.

The first mobile device is a mobile device according to this disclosure, the second mobile device being either similar to or different from the first mobile device, the second mobile device being distinct from the specific mobile device. In some examples the first mobile device and the second mobile device get connected to each other and may communicate with each other. Communication may be understood as exchanging data packets in the context of a communication protocol. Direct communications may use radio resources to be taken autonomously by a user equipment (UE) corresponding to a respective mobile device from a pool of resources which may be signaled by a base station or preconfigured in the UEs. According to some examples, communication between the first device and the second device takes place through a sidelink. The sidelink should be understood as permitting an exchange of signals between the first device and the second device. Radio resources utilization may be operated for example through time, frequency and space allocation techniques. Radio resources utilization may be operated taken into account service Quality of Service requirements such as throughput, delay, packet error rate and priority. Using a sidelink for such communication between mobile devices may reduce communication latency and reduce cell load through spatial re-use techniques.

Some example methods according to this disclosure relate to communication between mobile devices, differing from communication between a base station and a terminal using a static beam selection. Example methods according to this description enable dynamic beam selection. Example methods according to this disclosure differ from other methods resulting in using, to transfer user data, an omnidirectional long term reservation scheme which would limit selections to the frequency and time domains only. Some example methods according to this disclosure are indeed assigning resources selectively in the spatial domain or angular space.

In some examples, the methods according to this disclosure are applied to a framework of resource allocation in Mode 2(a) of 3GPP NR V2X (V2X meaning Vehicle to everything) for frequency bands higher than 6 GHz. In some examples, the method is a groupcast communications method, a groupcast communication being from one (single) mobile device to one or more mobile devices. In some examples, the mobile devices are equipped with several antenna panels enabling beamforming techniques. In some examples, mobile devices vehicles resources are scheduled using a semi-persistent scheme, also called long term resource reservation scheme. In some examples, the mobile devices are comprising one or more antenna panel, each panel being provided with at least two antenna elements to enable beamforming techniques.

In some examples, the first or second mobile devices according to this disclosure are one of a plurality of mobile devices forming a platoon. A platoon may be formed of a plurality of autonomous connected and interconnected vehicles. A platoon may comprise more than 25 vehicles. A platoon may comprise more than 50 vehicles. Using the method according to this disclosure may permit increasing an overall speed of displacement by avoiding or reducing risks of communication collisions.

An example method 100, as illustrated in FIG. 1, applies to a communication between a first mobile device and a second mobile device synchronized with the first mobile device. The first and the second mobile devices may be understood as synchronized when they share a common time reference.

Synchronization should be understood as a process to align, between different mobile devices, a local variable time characteristic, the characteristic being local in the sense that it is specific to each mobile device. Ideally, such local variable time characteristic would be evolving exactly in a same manner at different mobile devices if a network would be perfectly synchronized. Examples of such local variable characteristic comprise a logical or virtual device based on a hardware based device. Examples include time setting device such as a clock or a frequency synthesizer. In line with one such example, if connected mobile devices each comprise a clock, such mobile devices would be perfectly synchronized if their clock would indicate exactly the same time at a given instant. In another example, if connected mobile devices each comprise a frequency synthesizer, such mobile devices would be perfectly synchronized if their synthesizers operate at exactly the same frequency.

As illustrated in block 101 of FIG. 1, the method 100 comprises sensing, by the first mobile device, a plurality of preconfigured radio resources, each preconfigured radio resource corresponding to a specific set of coordinates in time, frequency and spatial domains. The sensing may for example take place using one or more antennas. The sensing may take place using one or more directional antennas adapted to sense a component of a radio wave along a specific spatial direction, also called a beam. The sensing is by the first mobile device. It should be understood that the first mobile device is named as "first" in order to differentiate it from others. In this respect, the word "first" should not be understood as implying that there is a certain "order". The sensing takes place for a plurality of preconfigured radio resources. In some examples, each preconfigured radio resource corresponds to a specific set of coordinates in a time, frequency and spatial domain for the first mobile device. The preconfigured radio resources are preconfigured in the time, frequency and special domains as far as the first mobile device is concerned. In the frequency domain, a preconfigured radio resource may be associated to a specific radio frequency. In the time domain, a preconfigured radio resource may be associated to a specific time window. In the spatial domain, a preconfigured radio resource may be associated to a specific beam or to a specific direction or to a specific angle. Each preconfigured radio resource of the plurality differs from any other preconfigured radio resource of the plurality by at least one coordinate. Two preconfigured radio resources of the plurality may correspond to a same frequency, to a same time window, but to a different beam. Two preconfigured radio resources of the plurality may correspond to a same beam, to a same time window, but to a different frequency. Two preconfigured radio resources of the plurality may correspond to a same beam, to a same frequency, but to a different time window. Two preconfigured radio resources of the plurality may correspond to a same beam, but to a different time window and frequency. Two preconfigured radio resources of the plurality may correspond to a same frequency, but to a different time window and beam. Two preconfigured radio resources of the plurality may correspond to a same time window, but to a different frequency and beam. Two preconfigured radio resources of the plurality may correspond to different time window, frequency and beam. The radio resources according to this disclosure are preconfigured in that such radio resources correspond to a specific, identified and limited number of radio resources which mobile devices may use to communicate with each other in the time and frequency domains, each mobile device further defining such radio resources in the spatial domain for example in line with beamforming configurations available to the same mobile device. In some examples, radio resources according to this disclosure are preconfigured such that they coincide in the time and frequency domain with radio resources preconfigured by other mobile devices. In some examples, radio resources according to this disclosure are preconfigured in that they coincide in the time and frequency domain with radio resources preconfigured by other mobile devices while occupying coordinates (such as beam, direction or angle) in the spatial domain which are specific to the first mobile device. In some examples, there are less than 100 different specific preconfigured radio resources coordinate combinations available in the frequency and time domains (regardless of the spatial domain). In some examples, there are more than 10 different specific preconfigured radio resources coordinate combinations available in the frequency and time domains (regardless of the spatial domain). The introduction of coordinated in the spatial domain according to this disclosure provides in some examples more than 100 different specific preconfigured radio resources in the frequency, time and spatial domains for a given mobile device, in view of the given mobile device beamforming possibilities for example. The use of different radio resources coordinates permits avoiding communication collisions. Communication collisions may take place for example when various pairs of mobile devices use a same radio resource to communicate and thereby may not be in a position to identify if a communication is meant to relate to the pair they are a member of. One should note that communication according to this disclosure relates to transmitting, to receiving, or to both transmitting and receiving. One should also note that when a given pair of first and second mobile devices according to this disclosure communicate, they may use different radio resources for transmission and for reception. Such a pair may also use a same radio resource for both transmission and reception. The sensing according to this disclosure may involve a scanning over various frequencies or time windows, ensuring that each preconfigured radio resource is subjected to sensing in the time and frequency spaces. The selection of the preconfigured radio resource according to example methods may in some examples start about 1000 ms before a transmission.

In an example where two pairs of mobile devices communicate using a same frequency and a same time window (or the same coordinates for radio resources in the frequency and time domains), collision may be avoided between the two pairs according to example methods according to this disclosure by selecting for each mobile device a specific direction in the spatial domain for transmitting a signal and communicate as a first mobile device in a manner which prevents collision. The specific direction may for example be adjusted in line with a line of sight with a second mobile device which should receive the transmission.

In some examples, the specific beam in the spatial domain comprises a beam direction and a beam angle. In some examples, the beam angle is of up to 90 degrees. In some examples, the beam angle is of more than 5 degrees. In some examples, the beam angle is comprised between 20 and 30 degrees. The beam angle may have an influence on collision risk or on the selectivity of communication. In particular, transmitting or receiving data using a larger beam angle may increase a risk to disrupt communication due to broadcasting or surveying a larger portion of space. Transmitting data using a reduced beam angle may lower a risk of communication collision but may increase a risk of a desired communication being missed (for example because data transmitted using a narrow beam happens not to reach a target which would be located in a blind spot, or because data reception using a narrow beam misses a reception due to the data being transmitted in a blind spot). When a given pair of mobile devices such as, for example, the first and the second mobile devices, communicate, such devices may use different beam angles.

In some examples, the sensing such as illustrated in block 101 comprises the first mobile device attempting to find available frequency radio resource (or subchannels) for a desired transmission to a second mobile device. The first mobile device may be pre-configured with a knowledge of frequency location and size of such subchannels.

In some examples, the mobile devices communicate using high frequency bands of more than 30 GHz and up to 63 GHz. In some examples, the mobile devices are vehicles provided with four or more panels provided on a vehicle rooftop, each panel comprising a uniform and linear array of four cross-polarized antenna elements with a distance of $\lambda/2$ between any two consecutive antenna elements, where $\lambda$ is the wavelength corresponding to the antenna, the panels each being perpendicular to a horizontal plane comprising the rooftop, each panel facing a direction different from the direction faced by the other panels. When using 4 panels, the 4 panels may face 4 cardinal directions at 90 degrees from each other (0, 90, 180 and 210 degrees). In some examples, the antenna elements are identical to each other, each being provided with a horizontal radiation diagram or radiation pattern. In some examples, each antenna element has an aperture. In some examples, the aperture is of 90 degrees. In some examples, multiple panels may be implemented on a mobile device (which may correspond to a UE, or user equipment) and multiple panels may be activated at a time. In some examples, a single panel may be used for transmission at a given time. In some cases, whereby four panels are used facing cardinal directions, each panel having a 90 degree aperture, the complete 360 degree angular space around the four panels may be divided into four angular complementary intervals, each one being 90° wide. In some examples, a beamforming mechanism focuses on a given direction around the panels. In such examples an average beam aperture at 3 dB may be of more than 20 degrees and of less than 30 degrees, for example 25 degrees.

As illustrated in block 102 of FIG. 1, the method 100 comprises identifying, by the first mobile device, for each sensed preconfigured radio resource, whether the preconfigured radio resource is occupied for communication between further mobile devices synchronized with the first mobile device. A preconfigured radio resource may be considered occupied if such preconfigured radio resource is identified as transmitting a signal on its respective frequency, time window and beam, or coordinates in the frequency, time and spatial domains. In some examples, occupancy of a pre-determined radio resource may be determined using a signal power threshold, whereby a pre-determined radio resource is considered as occupied if a signal is detected on the preconfigured radio resource concerned at a power above the threshold. Such a threshold may in some examples be dynamically determined in order to adapt the threshold to specific situations. In some examples, a granularity may be introduced to classify the preconfigured radio resources in classes related to a degree of occupancy, whereby degrees of occupancy may depend on a level of power (such as average level of power for example) of a signal detected on the preconfigured resource, whereby a signal of high power would correspond to high occupancy and a signal of low power to low occupancy, taking into account that lower occupancy would lead to less likely collision risks than high occupancy. Such identification may for example be stored in a list or in a table. Further mobile devices may be mobile devices according to this disclosure, such further mobile devices being of a same type or different from the first and second mobile devices. The further mobile devices are each distinct from the first and second mobile devices. The further mobile devices are communicating using resources which are preconfigured radio resources. The preconfigured radio resources form a group of radio resources which any one of the first, second or further mobile devices may use for communication with another one of the first, second of further mobile devices, the first, second and further mobile devices being synchronized. Because various mobile devices share a same group of available preconfigured radio resources for communication, there is a risk that such communications collide, for example if some of the mobile devices use a same preconfigured resource at some point in time. The present disclosure permits directing a choice of a specific preconfigured radio resource within this group for a first vehicle to communicate with a second vehicle while reducing or suppressing a risk of a communication collision.

In some examples, in order to identify whether a sub-channel (or preconfigured radio resource) is used or not by other mobile devices such as the further mobile devices, the first mobile device tries to decode a Sidelink Control Information (SCI) for each subchannel or preconfigured radio resource. The mobile devices may be pre-configured with locations and associated MCS (Modulation and Coding Scheme) of the SCI concerned. The decoding of SCI may then be used to eliminate occupied subchannels (subchannel being also called preconfigured radio resources in this disclosure) for the selection of the specific preconfigured radio resource. The specific preconfigured radio resource may be in some examples randomly selected among all the available preconfigured radio resources, available as in not occupied.

In some examples, in order to identify whether a subchannel (or preconfigured radio resource) is used or not by other mobile devices such as the further mobile devices, a first mobile device may perform a power measurement on pilots on each preconfigured radio resource. This measurement may for example take place if a first mobile device cannot decode the SCI attached to a preconfigured radio resource. The power measurement may be for example averaged over a 1000 ms period and may result in identifying a preconfigured radio resources as an occupied preconfigured radio resources. The occupied preconfigured radio resource is then excluded from the selection procedure according to example methods of this disclosure.

In some examples, an SCI format may comprise the following information:
Priority (3 bits);
Resource reservation (4 bits). This field announces resources to be used based on the sensing. This field may be understood as follows:

TABLE 1

| Resource reservation field | Corresponding value of V | Indication |
|---|---|---|
| '0001', '0010', . . . , '1010' | Decimal equivalent to the field '1', '2', . . . '10' | The same resource is reserved for the next transmission after 100*V ms |
| '1011' | 0.5 | The same resource is reserved for the next transmission after 50 ms |
| '1100' | 0.2 | The same resource is reserved for the next transmission after 20 ms |
| '0000' | 0 | The same resource is not reserved for the next transmission |
| '1101', '1110', '1111' | Reserved | Reserved |

Frequency resource location of initial transmission (X bits). A bit pattern used to define PSSCH (Physical Sidelink Shared Channel) physical RB (resource block) resources;
Time gap (4 bits). The number of subframes gap between a first and an optional second transmission (HARQ (Hybrid Automatic Repeat reQuest) purpose);
MCS (5 bits);
Retransmission index (1 bit). For HARQ purpose, i.e. indicates if the PSSCH refers to the first or the optional second transmission;
Reserved bits for zero-padding to reach 32 bits.

A reselection counter value may not be included within the SCI. In other words, if a first mobile device decodes the SCI, the first mobile device may obtain information, with the resource reservation field, about the duration between a former transmission and a next one, corresponding to the RRI (resource reservation interval). However, the $N_{RRI}$ is not indicated in the SCI. This means that if a first mobile device decodes an SCI at the end of a sensing window, even though it could be the last use of the corresponding resource, it may not consider the resource as available as it is in such a case not in a position to predict the availability of the resource.

As illustrated in block 103 of FIG. 1, the method 100 comprises receiving, at the first or at the second mobile device, for each occupied preconfigured radio resource, and from the further mobile devices, an indication of future occupied preconfigured radio resource utilization by the further mobile devices in the spatial domain. Such indication of future occupied preconfigured radio resource utilization provides in some examples an indication as to which preconfigured radio resource may be used by the further mobile devices at some point in the future. Due to the fact that the methods according to this disclosure apply to mobile devices, the spatial relationship between various such mobile devices may evolve over time. In some examples, a first mobile device may be facing a second mobile device at a first instant, while the second mobile device may have moved to the back of the first mobile device shortly after the first instant. In some examples, the mobile devices move at a speed of about 120 km/h and may cross each other, as they would for example on a motorway, in which case a relative speed between a first and a second vehicle, or between any of the first and second vehicle and a further vehicle, may reach about 240 km/h if they circulate in opposite directions. This relative movement corresponds to about 67 meters per second. As illustrated by such an example of relative movement, the choice, in the spatial domain, of a specific beam used for communicating possibly should change over time, between the first and second mobile devices, or between further devices, for example in order to take into account line of sight between mobile devices. As radio resource utilization may change over time, communication collisions which may have been avoided at a point in time may occur at a later point in time (due to a change of radio resource by one or more mobile device to communicate). The reception of an indication of future occupied preconfigured radio resource utilization by the further mobile devices in the spatial domain is aiming at avoiding or reducing such a risk of communication collision.

In some cases, when a specific preconfigured radio resource is selected for communication between a first and a second vehicle, such a specific preconfigured radio resource is maintained for a certain duration, for example a duration corresponding to a resource reservation interval or RRI. In some examples, during such certain duration during which the specific preconfigured radio resource is selected, changes in the occupation of some preconfigured radio resources may take place. The methods according to this disclosure permit preventing such situations by receiving the future occupied preconfigured radio resource utilization by the further mobile devices as for example illustrated in block 103. In some cases, the future according to this disclosure comprises a period of 5 seconds after reception of the indication of future occupied preconfigured radio resource utilization by the further mobile devices in the spatial domain. In some cases, the future according to this disclosure comprises a period of 3 seconds after reception of the indication of future occupied preconfigured radio resource utilization by the further mobile devices in the spatial domain. In some cases, the future according to this disclosure comprises a period of 1 seconds after reception of the indication of future occupied preconfigured radio resource utilization by the further mobile devices in the spatial domain. In some cases, the future according to this disclosure comprises a period of 3 RRI after reception of the indication of future occupied preconfigured radio resource utilization by the further mobile devices in the spatial domain. In some cases, the future according to this disclosure comprises a period of 2 RRI after reception of the indication of future occupied preconfigured radio resource utilization by the further mobile devices in the spatial domain. In some cases, the future according to this disclosure comprises a period of 1 RRI after reception of the indication of future occupied preconfigured radio resource utilization by the further mobile devices in the spatial domain.

In some examples, when communicating with the second mobile device, the first mobile device transmits a packet during a duration TP (e.g. slot duration or packet transmission time) and waits for a given duration RRI before transmitting other packets on the same preconfigured radio resource. The preconfigured radio resource is then used for a given number of transmissions.

In some examples methods according to this disclosure, a semi-persistent scheme or SPS is used, the SPS being parametrized by the RRI which is the time interval between two consecutive packet transmissions (transmissions may also be called "reservations") using the same preconfigured radio resource. Example values of RRI are {20, 50, 100, 200, 300, . . . , 1000} ms (milliseconds) and may be selected based on the mobility, among other parameters. In some examples, a number of transmissions $N_{RRI}$ (also called reselection counter) is associated to the RRI in the same SPS, the $N_{RRI}$ being randomly computed according to the following rule:

$$N_{RR1} \in \begin{cases} [25; 75] & \text{if } RRI = 20 \text{ ms} \\ [10; 30] & \text{if } RRI = 50 \text{ ms} \\ [5; 15] & \text{if } RRI \geq 100 \text{ ms} \end{cases} \quad \text{[Math 1]}$$

This rule implies that the SPS duration TSPS, that equals $N_{RRI}*RRI$, is bounded as follows:

500 ms≤$T_{SPS}$, $T_{SPS}$≤1500 ms if RRI∈ {20,50,100} ms  [Math 2]

In such cases, during TSPS, the user transmits $N_{RRI}$ times in the same preconfigured radio resource where each transmitting time is TP. In LTE (long term evolution) for example, the transmission duration TP may be 1 ms (TTI). For NR (new radio), duration may be dynamic.

When $N_{RRI}$ transmissions are reached, the mobile device may either re-use the same preconfigured radio resource with the same RRI with a probability p or draw another available preconfigured radio resource with another RRI with probability 1-p. The value of $N_{RRI}$ may be re-drawn in both cases.

In some examples, resource selection according to this disclosure is according to 3GPP NR V2X Mode 2(a), specifically TR 38.885 entitled "Resource selection procedures for Mode 2(a), in the context of a semi-persistent scheme where resource(s) are selected for multiple transmissions of different TBs and a dynamic scheme where resource(s) are selected for each TB transmission". In some examples, the method according to this disclosure applies a semi-persistent scheme (SPS), also called here long term resource reservation. The mode 2(a) may for example apply to mobile devices being out-of-coverage such as vehicles which are not reachable by a base station. In some example methods according to this disclosure, radio resource allocation is not centralized (for example at a base station) but distributed. In some examples, mobile devices such as the first mobile device autonomously select a resource for transmission. In some examples, a long term resource reservation scheme is used to allow communication.

In some cases, such an indication of future occupied preconfigured radio resource utilization by the further mobile devices in the spatial domain is received at the first mobile device, i.e. the mobile device which handled the sensing as illustrated for example in block 101 and the identifying as illustrated for example in block 102. In such cases, the first mobile devices somehow centralize an execution of an example method according to this disclosure. In other cases, the second mobile device may be the mobile device receiving the indication of future occupied preconfigured radio resource utilization by the further mobile devices in the spatial domain. The second mobile device may take this information into account directly in its communications with the first device, or may transmit related relevant information to the first mobile device in this respect. In other cases, the first mobile device receives such indication related to a first group of further mobile devices and the second mobile device receives such indication related to a second group of further mobile devices, the first and second mobile devices relying on this information for selection of the preconfigured radio resource which they will use to communicate. The reception of this information may thereby be exclusive to one of the first or second mobile device, or be distributed or shared between them.

In some examples, such as the example of FIG. 1, the receiving the indication of future occupied preconfigured radio resource utilization by the further mobile devices in the spatial domain takes place using a signal orthogonal to a signal for the communication between the first and the second mobile devices. In some cases, some communication signals such as signals transmitting user data may be used for communication between the first and second vehicles once a specific preconfigured radio resource has been selected according to this disclosure, while control signals such as signals related to information leading to selecting the specific preconfigured radio resource may be orthogonal to the communication signals, in order to preserve communication signals bandwidth for user data. In some cases, orthogonality is achieved by a 90 degree phase shift between the control and communication signals. In some cases, orthogonality is achieved by using for example a frequency below 6 Ghz for control signals and a frequency above 30 GHz for user data. In some cases, orthogonality is achieved by using for example one or more specific RBs (resource blocks) for control signals.

In some examples, control information related to a specific mobile device (for example the first, second, or a further mobile device) comprising one or more of a specific mobile device identifier (ID), or specific mobile device mobility information may be broadcast in all directions (i.e. without beamforming) using a signal orthogonal to a signal used for transmitting user data. Such broadcasting of control information may facilitate initializing a communication between a first and a second mobile device. More specifically, the first mobile device may, with a given first mobile device IDTx, desire to transmit packets (user data) to a second mobile device with a second mobile device IDRx using user data signaling over a specific preconfigured radio resource using an example method according to this disclosure. In parallel, the first and second mobile devices may independently obtain resources via SPS using an orthogonal spectrum for the broadcast of their ID, positions and/or mobility information, the orthogonal spectrum being orthogonal to the specific preconfigured radio resource used for the user data. In some examples, the first mobile device decodes all possible SCIs in the orthogonal spectrum to find the preconfigured radio resources used by the one or more second mobile devices. The first mobile device then obtains an updated mobility information of the one or more second devices. In some examples, broadcasting control information using the orthogonal spectrum is using a power lower than the power used for communicating user data using the specific preconfigured radio resource. Using a lower power helps obtaining a higher spatial coverage, antenna radiations being larger at lower power. In some cases, dedicated panels and antennas with an omnidirectional radiation pattern are provided for such orthogonal spectrum in order to increase the angular space covered.

As illustrated in block 104 of FIG. 1, the method 100 comprises selecting, by the first or by the second mobile device, a specific preconfigured radio resource for the first and the second mobile devices to communicate using a specific beam in the spatial domain, whereby using the specific beam is reducing or preventing communication collisions, in the spatial domain, with the future occupied preconfigured radio resource utilization.

Reducing or preventing communication collisions may be achieved by using a specific frequency in the frequency domain, irrespectively of the time or spatial domains. This use of a specific frequency in the frequency domain, irrespectively of the time or spatial domains however would imply that such a frequency would not be occupied by any further mobile devices, which would greatly reduce the number of radio resources available to communicate. The introduction of not only the time dimension, which in itself multiplies a number of radio resources available, but also of the spatial dimension greatly multiplies the number of radio resources which may be used for communicating without collision.

In some cases, the selection as per the example of the block 104 of FIG. 1 comprises selecting a preconfigured radio resource sharing two coordinates (for example in the time and frequency domains) with an occupied preconfigured radio resource, but using a third coordinate (for example in the special domain) differing from the occupied preconfigured radio resource, and from coordinates related to future occupied preconfigured radio resource utilization.

In some examples, the preconfigured radio resources identified as occupied and the preconfigured radio resources indicated as future occupied preconfigured radio resource are mapped as such on a preconfigured radio resources map, whereby such map may indicate which preconfigured radio resources remain available, being neither identified as occupied, nor indicated for future utilization. Such preconfigured radio resources remaining available may be candidates for selection, whereby the selection may for example take place among the candidates using one or more criteria, or randomly. Example criteria may be choosing a candidate corresponding to a beam aligned with a line of sight (LoS) between the first and the second vehicle in order to select a specific preconfigured radio resource in the time, frequency and spatial domains according to examples of this disclosure.

In some cases, for example illustrated in FIG. 1, the selecting the specific preconfigured radio resource for the communication between the first and the second mobile device using a specific beam in the spatial domain takes into account line of sight, LoS, information related to the first, the second and the further mobile devices. Using such LoS information indeed permits taking the relative positions of the first, second and further mobile devices into account and leveraging such LoS information to guide a selection of a specific beam. In other words, if a first mobile device is surrounded by further mobile devices and by the second mobile device, selecting a beam for communication with the second mobile device which would be best aligned to the LoS with the second mobile device is likely not to conflict with a communication between further vehicles in the spatial domain, unless a communication between further vehicles would happen to be along the same LoS, in which case a conflicting same beam or coordinate in the spatial domain may be used, while avoiding conflict by using either a different frequency in the frequency domain, or a different time period in the time domain.

As illustrated in block 105 of FIG. 1, the method 100 comprises communicating between the first and the second mobile devices using the selected specific preconfigured radio resource. Such communication thereby takes place while reducing or suppressing communication collision risks.

Another example method 200 according to this disclosure is illustrated by FIG. 2. Such method 200 comprises blocks 101-105 which are repeated from the example method 100 of FIG. 1. Method 200 further comprises block 206 of transmitting, by the first or by the second mobile device, and to the further mobile devices, a specific indication of future occupied preconfigured radio resource utilization in the spatial domain for the communicating between the first and the second mobile devices. This transmitting may take place by one or by both member of the pair of the first and second mobile devices and to the further mobile devices. This transmitting facilitates, for the further mobile devices, the selection of a preconfigured radio resource which would not or not be likely to conflict with future specific pre-configures radio resource used by the first and second mobile devices to communicate. In other words, this would permit that the further devices may apply the method of the invention as first or second mobile device by receiving such transition according to block 206.

In some examples, such as the example illustrated by FIG. 2, the transmitting, by the first or by the second mobile device, and to the further mobile devices, a specific indication of future occupied preconfigured radio resource utilization in the spatial domain for the communicating between the first and the second mobile devices takes place using a signal orthogonal to a signal for the communication between the first and the second mobile devices.

In some examples, such as the example illustrated by FIG. 2, a method 200 may further comprise, as illustrated by block 207, broadcasting, by the first or by the second mobile device, one or more of a respective mobile device identifier, and respective mobility information. Broadcasting a respective mobile device identifier and respective mobility information may permit receivers of the broadcasts (such as the further mobile devices for example) to clearly identify the first or second mobile devices and related trajectory, thereby enabling for example relating such mobility information to future occupation of preconfigured resources. Mobility information may for example comprise GPS (global positioning system) coordinates or a succession of GPS coordinates. Mobility information may for example comprise an amount and direction of displacement represented by a vector or by a succession of vectors. Such information may permit predicting a future trajectory of the first, second, or both mobile devices. In some examples, such trajectory leads to LoS information, and to future beam selection information according to example methods according to this disclosure.

Mobility information for a specific mobile device may in some examples comprise information related to preconfigured radio resources used by the specific mobile device, such as a specific beam used, or a specific angle or direction used in the spatial domain. In some examples, each specific mobile device such as any of the first, second or further mobile devices, may use a beam book comprising its own list of available beams it would be able to provide using its own antenna configuration. In some cases, a beam book is common to one or more of the first, second and further mobile devices, whereby a beam may be identified by all such devices in a same common manner in a same common beam book.

In some example, the first mobile device obtains the second mobile device identifier (or mobile device identifiers from the further mobile devices) from higher layer signaling, for example from one or more of the RRC (Radio resource control), PDCP (Packet data convergence control), RLC (Radio link control), MAC (Medium access control) or physical sublayer. In some examples, the mobile device identifier of a mobile device with which the first mobile device should communicate is available to the first mobile device.

In some examples, such as the example illustrated by FIG. 2, a method 200 may further comprise, as illustrated by block 208, either receiving, at the first mobile device, one or more of a second mobile device identifier, and second mobile device mobility information; or receiving, at the second mobile device, one or more of a first mobile device identifier, and first mobile device mobility information; and receiving, at the first or at the second mobile device, one or more of an identifier, or mobility information from each of the one or more further mobile devices. The reception of such information mirrors the broadcasting according to block 207, whereby such information enables to a receptor the building of a map of situation of the various mobile devices concerned, as well as building an evolution of such a map over time, in particular for the future, thereby facilitating the identification of potential communication conflicts or collisions in the spatial domain, present or future.

In some cases, a first mobile device may already be "paired" or transmitting to one or more second mobile device receivers and signals its first mobile device trajectory intention or mobility information as well as the trajectory intention or mobility information of all its paired second mobile devices receivers. In some examples using LoS-based beamforming, other transmitter mobile devices of the further mobile devices may predict the spatial occupancy of this transmitter first mobile device for a signaled amount of time. Such a first mobile device already "paired" with its receivers may estimate a trajectory for each receiver. Such a first mobile device may then signal or broadcast its own trajectory intention or mobility information, as well as its receivers (second mobile devices) trajectory intentions or mobility information and associated selected beams or angles.

In some examples, mobility information may be transmitted comprised in a SCI (sidelink control information) and contained in a PSCCH (Physical Sidelink Control CHannel). In some example, such as the table below, the following fields may be used, Tx corresponding for example to a first mobile device as transmitting mobile device, and Rx(N) corresponding to one or more second mobile devices as receiving devices, N being an integer having a value of 1 or more, x(t) and y(t) representing geographical coordinates at time t.

TABLE 2

| Field | Content | Periodicity |
|---|---|---|
| Tx trajectory intention | Four floats: x(t), y(t), x(t + dt), y(t + dt) | Every n*RRI, n = 1, ..., $N_{RRI}$ |
| Rx$^{(1)}$ trajectory intention | Four floats: x(t), y(t), x(t + dt), y(t + dt) | Every n*RRI, n = 1, ..., $N_{RRI}$ |
| Rx$^{(1)}$ direction selection | One float | Every n*RRI, n = 1, ..., $N_{RRI}$ |
| ... | ... | ... |
| Rx$^{(N)}$ trajectory intention | Four floats: x(t), y(t), x(t + dt), y(t + dt) | Every n*RRI, n = 1, ..., $N_{RRI}$ |
| Rx$^{(N)}$ direction selection | One integer | Every n*RRI, n = 1, ..., $N_{RRI}$ |

In other examples, such as the table below, the following fields may be used, Tx corresponding for example to a first mobile device as transmitting mobile device, and Rx(N) corresponding to one or more second mobile devices as receiving devices, N being an integer having a value of 1 or more, x(t), y(t) and z(t) representing geographical coordinates at time t, the z coordinate corresponding for example to height or altitude. In such examples the content may correspond to specific times which may not be periodic. In such examples, the content may correspond to K components which may be scalar, for example angles, or vectors, such as coordinates. In other examples (not illustrated) the various $t_1$-$t_k$ Times corresponding to each Content value of the Field may be different for different Rx(N).

TABLE 3

| Field | Content | Time |
|---|---|---|
| Tx trajectory intention for $t_1$ to $t_K$ | 3*K values: $x_{Tx}(t_1)$, $y_{Tx}(t_1)$, $z_{Tx}(t_1)$, $x_{Tx}(t_2)$, $y_{Tx}(t_2)$, $z_{Tx}(t_2)$, ..., $x_{Tx}(t_K)$, $y_{Tx}(t_K)$, $z_{Tx}(t_K)$ | $t_1, t_2, ..., t_K$ |
| Rx(1) trajectory intention for $t_1$ to $t_K$ | 3*K values: $x_{Rx(1)}(t_1)$, $y_{Rx(1)}(t_1)$, $z_{Rx(1)}(t_1)$, $x_{Rx(1)}(t_2)$, $y_{Rx(1)}(t_2)$, $z_{Rx(1)}(t_2)$, ..., $x_{Rx(1)}(t_K)$, $y_{Rx(1)}(t_K)$, $z_{Rx(1)}(t_K)$ | for $t_1$ to $t_K$ |
| Rx(1) direction selection for $t_1$ to $t_K$ | K components: direction$_{Rx(1)}(t_1)$, direction$_{Rx(1)}(t_2)$, ..., direction$_{Rx(1)}(t_K)$ | for $t_1$ to $t_K$ |
| ... | ... | ... |
| Rx(N) trajectory intention for $t_1$ to $t_K$ | 3*K values: $x_{Rx(N)}(t_1)$, $y_{Rx(N)}(t_1)$, $z_{Rx(N)}(t_1)$, $x_{Rx(N)}(t_2)$, $y_{Rx(N)}(t_2)$, $z_{Rx(N)}(t_2)$, ..., $x_{Rx(N)}(t_K)$, $y_{Rx(N)}(t_K)$, $z_{Rx(N)}(t_K)$ | for $t_1$ to $t_K$ |
| Rx(N) direction selection for $t_1$ to $t_K$ | K components: direction$_{Rx(N)}(t_1)$, direction$_{Rx(N)}(t_2)$, ..., direction$_{Rx(N)}(t_K)$ | for $t_1$ to $t_K$ |

In some cases, as for example anyone of methods 100 or 200, or other methods according to this disclosure, the sensing of the plurality of preconfigured radio resources and the selecting of the specific preconfigured radio resource are selectively triggered using a rule. The use of a rule may for example permit adapting the method of this disclosure to different situations. In an example, if future occupation of preconfigured radio resources may be predicted over a relatively long period of time, for example due to the fact that the mobile devices have a stable trajectory, for example on a motorway in a low density area, a method according to this disclosure may be iterated at a relatively low frequency (for example at most once every 5 seconds) for a given first mobile device. In some examples, such as in a high traffic city center area, subjected to rapid changes of trajectories, and to a high density of further mobile devices, a method according to this disclosure may be iterated at a relatively high frequency (for example once or more every second). In some examples, a method according to this disclosure is iterated according to a rule at least once every 20 ms (millisecond). In some examples, a method according to this disclosure is iterated according to a rule at least once every 50 ms. In some examples, a method according to this disclosure is iterated according to a rule at least once every 100 ms. In some examples, a method according to this disclosure is iterated according to a rule at least once every 200 ms. In some examples, a method according to this disclosure is iterated according to a rule at least once every 500 ms. In some examples, a method according to this disclosure is iterated according to a rule at least once every 1000 ms. In some examples, a method according to this disclosure is iterated according to a rule at most once every second. In some examples, a method according to this disclosure is iterated according to a rule at most once every 5 seconds. A rule may also direct a relative frequency between the selecting and the communicating. In some examples, the selecting occurs at the same frequency as the communicating, thereby for example permitting selecting a specific radio resource each time a transmitting takes place as comprised with the communicating, which would for example be adapted to a dynamic environment. In other situations, the selecting may take place less frequently than the communicating, the selecting for example taking place conditionally, for example if a change in occupation is taking place as detected during sensing operations. In some examples, the sensing takes place during most of the time during which the method is applied. In some examples, the sensing takes place during more than 95% of the time during which the method is applied. In some examples, the sensing takes place during more than 80% of the time during which the method is applied.

In some examples, selection of a preconfigured radio resource according to a method according to this disclosure takes place with a time granularity lower than an RRI. In some examples, such a granularity may be dynamically determined by a rule according to this disclosure, for example in function of mobile device mobility or of radio conditions.

In some examples, a rule may implement that after an n-th RRI, n≥1, n being an integer, a transmitter such as the first mobile device keeps sensing preconfigured radio resources sharing a same frequency and time in the frequency and time domains as the specific preconfigured radio resource, and do so for all beams, or for all beams of its beam book, such beam book comprising a finite number preconfigured beams for the first mobile device. The first mobile device may then select an appropriate beam for the transmission of the other packets before the end of the (n+1)-th RRI.

In some examples, a transmitter first mobile device is given $N_{RRI}$ consecutive transmissions and either proceeds to a sensing to evaluate an appropriate preconfigured radio resource without considering mobility information, or proceeds with a prediction of a receiver second mobile device movement and changes beam (i.e. changes the spatial coordinate of the radio resource) in accordance with the movement and while maintaining radio resource time and frequency domain coordinates unchanged. Given mobile devices mobility information, a selected preconfigured radio resource may be appropriate for a number of transmitter and receiver (first and second mobile devices) at one time but not appropriate at another time and/or even prone to causing communication collisions for example with other pairs of communicating mobile devices. Examples methods may indeed thereby be periodically iterated.

In some examples, such as the example illustrated by FIG. 2, a method 200 may further comprise, detecting, by the first mobile device, a potential future communication collision between the selected specific preconfigured radio resource and the received future occupied preconfigured radio resource utilization; and, in response to detecting the collision, proceed with one or more of selecting an alternative specific preconfigured radio resource to communicate between the first and the second mobile devices; and/or pausing communication during a collision time. Such behavior permits, when selecting an alternative, to avoid the collision by changing the radio resource which would otherwise be the object of a collision, or to stop transmission during a potential collision time window. In some cases, a rule determines first pausing communication, then selecting an alternative if for example a collision time exceeds a predetermined threshold.

In some cases, for example in emergency situations for transmission of emergency messages, conflicts or communication collision risks may be ignored and the methods according to this disclosure may not be used in order to preempt a radio resource.

Another example method 300 according to this disclosure is illustrated by FIG. 3. Such method 300 comprises blocks 101-105 which are repeated from the example method 100 of FIG. 1, or from example method 200 of FIG. 2. The various blocks of the different methods hereby described may indeed be combined in different manners. Method 300 further comprises block 309 of selecting the further mobile devices from a group of surrounding mobile devices using selection criteria. Such a selection of the further mobile devices from a group of surrounding mobile devices may permit phasing the method according to this disclosure and avoid unduly lengthy or complex computing operations, in particular when a number of surrounding mobile devices is relatively high, for example of the order of a hundred or more mobile devices. By surrounding mobile devices, it should be understood that such surrounding mobile devices may be sensed by the first mobile device when communicating using the preconfigured radio resources. The surrounding mobile devices considered should be synchronized with the first or second mobile devices. The surrounding mobile devices may in some cases be located less than 1 km from the first mobile device. The surrounding mobile devices may in some cases be located less than 0.5 km from the first mobile device. The surrounding mobile devices may in some cases be located less than 200 m from the first mobile device. The surrounding mobile devices may in some cases be located less than 100 m from the first mobile device. The surrounding mobile devices may in some cases be located less than 50 m from the first mobile device. The surrounding mobile devices may in some cases be located less than 20 m from the first mobile device. The surrounding mobile devices may in some cases be located less than 10 m from the first mobile device. The surrounding mobile devices may in some cases be located less than 5 m from the first mobile device.

In some examples such as illustrated in FIG. 3, the criteria of block 309 comprises one or more of a distance between each surrounding mobile device and the first mobile device or a SINR. When using a distance related criteria, the further mobile devices may be the surrounding mobile devices closest to the first mobile device. Proximity may be evaluated taking for example the mobility information as for example illustrated in blocks 207 and 208 of method 200. In some examples, the criteria comprise a distance between each surrounding mobile device and the first or the second mobile device, whereby the distance between each further mobile device and the first or second mobile device is of less than a threshold. In some examples, the threshold is of about 50 meters. In some examples, the threshold is of about 100 meters. In some examples, the threshold is of about 200 meters. In some examples, the threshold is of about 500 meters. When using SINR as criteria, further mobile devices considered may for example be the mobile devices having a relatively higher SINR, for example mobile devices having a SINR above a SINR threshold.

In some examples, the selection criteria progressively evolve over time so a number of the selected further mobile devices increases over time. Proceeding in this manner permits the progressive processing of surrounding vehicles, in order to avoid undue complexity for example in situation where the area surrounding the first vehicle is particularly crowded with mobile devices. In some examples, a transmission power for the communicating with the second mobile device is set to avoid a communication collision with a mobile device located beyond the threshold. In some examples, the transmission power is lowered below the threshold to avoid collision with surrounding mobile devices which are not further mobile devices as per methods of this disclosure. Such examples are examples of a layered spatial multiplexing of long term resource reservation.

FIG. 4 illustrates an example mobile device 400 according to this disclosure which comprises a processor 401 comprising electronic circuits for computation managed by an operating system, a memory 402 comprising integrating circuits for storing information for use by a processor such as processor 401, and a networking module or communication device 403 for communication and interaction between devices or nodes on a network. The mobile device 400 also comprises a plurality of antennas 410-412 permitting beamforming, or multiplexing in the spatial domain, beamforming permitting spatial filtering or directional signal transmission or reception by combination of constructive and destructive interferences. The mobile device 400 may be configured to operate as a first mobile device comprising the processor 401 adapted to perform according to any of the methods according to this disclosure. In some cases, the mobile device may further comprise an omnidirectional antenna configured for an orthogonal signal as mentioned in this disclosure.

FIG. 4 also illustrates a non-transitory machine-readable or computer readable storage medium, such as, for example, node memory or storage unit 402, whereby the non-transitory machine-readable storage medium is encoded with instructions 404 executable by a processor such as processor 401, the machine-readable storage medium comprising instructions 404 to operate processor 401 to perform as per any of the example methods hereby described.

A computer readable storage according to this disclosure may be any electronic, magnetic, optical or other physical storage device that stores executable instructions. The computer readable storage may be, for example, Random Access Memory (RAM), an Electrically Erasable Programmable Read Only Memory (EEPROM), a storage drive, and optical disk, and the like. As described hereby, the computer readable storage may be encoded with executable instructions according to the methods hereby described.

Storage or memory may include any electronic, magnetic, optical or other physical storage device that stores executable instructions as described hereby.

The invention claimed is:

1. A method to communicate between a first mobile device and a second mobile device synchronized with the first mobile device, the method comprising:
sensing, by the first mobile device, a plurality of preconfigured radio resources, each preconfigured radio resource corresponding to a specific set of coordinates in time, frequency and spatial domain;
identifying, by the first mobile device, for each sensed preconfigured radio resource, whether the preconfigured radio resource is occupied for communication between further mobile devices synchronized with the first mobile device;
selecting the further mobile devices from a group of surrounding mobile devices using selection criteria;
receiving, at the first mobile device or at the second mobile device, for each occupied preconfigured radio resource, and from the further mobile devices, an indication of future occupied preconfigured radio resource utilization by the further mobile devices in the spatial domain;
selecting, by the first mobile device or by the second mobile device, a specific preconfigured radio resource for the first mobile device and the second mobile device to communicate using a specific beam in the spatial domain, wherein the using the specific beam reduces or prevents communication collisions, in the spatial domain, with the future occupied preconfigured radio resource utilization; and
communicating between the first mobile device and the second mobile device using the selected specific preconfigured radio resource.

2. The method according to claim 1 further comprising:
transmitting, by the first mobile device or by the second mobile device, and to the further mobile devices, a specific indication of future occupied preconfigured radio resource utilization in the spatial domain for the communicating between the first mobile device and the second mobile device.

3. The method according to claim 1, wherein the receiving the indication of future occupied preconfigured radio resource utilization by the further mobile devices in the spatial domain takes place using a signal orthogonal to a signal for the communication between the first mobile device and the second mobile device.

4. The method according to claim 1, wherein the selecting the specific preconfigured radio resource for the communication between the first mobile device and the second mobile device using a specific beam in the spatial domain takes into account a line of sight, LoS, information related to the first, the second and the further mobile devices.

5. The method according to claim 1, wherein the sensing the plurality of preconfigured radio resources and the selecting the specific preconfigured radio resource are selectively triggered using a rule.

6. The method according to claim 1 further comprising:
detecting, by the first mobile device, a potential future communication collision between the selected specific preconfigured radio resource and the received future occupied preconfigured radio resource utilization; and
in response to detecting the collision, proceed with one or more of:

selecting an alternative specific preconfigured radio resource to communicate between the first mobile device and the second mobile device; and pausing communication during a collision time.

7. The method according to claim 1, wherein the criteria comprise one or more of:

a distance between each surrounding mobile device and the first mobile device; and a signal interference noise ratio, SINR.

8. The method according to claim 1, wherein the selection criteria progressively evolve over time as a number of the selected further mobile devices increases over time.

9. The method according to claim 1, wherein the criteria comprise a distance between each surrounding mobile device and the first mobile device or the second mobile device, wherein the distance between each further mobile device and the first mobile device or second mobile device is less than a threshold.

10. The method according to claim 9, wherein a transmission power for the communicating between the first mobile device and the second mobile device is set to avoid a communication collision with a mobile device located beyond the threshold.

11. A non-transitory computer-readable storage medium comprising instructions which, when executed by a processor of a mobile device, cause the processor to carry out the method according to claim 1.

12. A mobile device comprising a processor, a memory, a networking module and a plurality of antennas permitting beamforming, the processor being configured to operate according to claim 1.

13. A method to communicate between a first mobile device and a second mobile device synchronized with the first mobile device, the method comprising:

sensing, by the first mobile device, a plurality of preconfigured radio resources, each preconfigured radio resource corresponding to a specific set of coordinates in time, frequency and spatial domain;

identifying, by the first mobile device, for each sensed preconfigured radio resource, whether the preconfigured radio resource is occupied for communication between further mobile devices synchronized with the first mobile device;

receiving, at the first mobile device or at the second mobile device, for each occupied preconfigured radio resource, and from the further mobile devices, an indication of future occupied preconfigured radio resource utilization by the further mobile devices in the spatial domain;

selecting, by the first mobile device or by the second mobile device, a specific preconfigured radio resource for the first mobile device and the second mobile device to communicate using a specific beam in the spatial domain, wherein the using the specific beam reduces or prevents communication collisions, in the spatial domain, with the future occupied preconfigured radio resource utilization;

communicating between the first mobile device and the second mobile device using the selected specific preconfigured radio resource; and broadcasting, by the first mobile device or by the second mobile device, one or more of a respective mobile device identifier, and respective mobility information.

14. A method to communicate between a first mobile device and a second mobile device synchronized with the first mobile device, the method comprising:

sensing, by the first mobile device, a plurality of preconfigured radio resources, each preconfigured radio resource corresponding to a specific set of coordinates in time, frequency and spatial domain;

identifying, by the first mobile device, for each sensed preconfigured radio resource, whether the preconfigured radio resource is occupied for communication between further mobile devices synchronized with the first mobile device;

receiving, at the first mobile device or at the second mobile device, for each occupied preconfigured radio resource, and from the further mobile devices, an indication of future occupied preconfigured radio resource utilization by the further mobile devices in the spatial domain;

selecting, by the first mobile device or by the second mobile device, a specific preconfigured radio resource for the first mobile device and the second mobile device to communicate using a specific beam in the spatial domain, wherein the using the specific beam reduces or prevents communication collisions, in the spatial domain, with the future occupied preconfigured radio resource utilization;

communicating between the first mobile device and the second mobile device using the selected specific preconfigured radio resource;

either receiving, at the first mobile device, one or more of a second mobile device identifier, and second mobile device mobility information; or receiving, at the second mobile device, one or more of a first mobile device identifier, and first mobile device mobility information; and receiving, at the first mobile device or at the second mobile device, one or more of an identifier, or mobility information from each of one or more of the further mobile devices.

* * * * *